United States Patent [19]

Danielli

[11] Patent Number: 4,562,648
[45] Date of Patent: Jan. 7, 1986

[54] APPARATUS FOR MEASURING DIAMETRAL AND AXIAL DIMENSIONS

[75] Inventor: Franco Danielli, Zola Predosa, Italy

[73] Assignee: Finike Italiana Marposs S,p.A., S. Marino di Bentivoglio, Italy

[21] Appl. No.: 707,144

[22] Filed: Mar. 1, 1985

[30] Foreign Application Priority Data

Apr. 4, 1984 [IT] Italy ................................. 3409 A/84

[51] Int. Cl.[4] ................................................. G01B 7/02
[52] U.S. Cl. ..................................... 33/504; 33/143 L; 33/147 N; 33/542; 33/549
[58] Field of Search ................ 33/503, 1 M, 504, 573, 33/550, 557, 558, 143 L, 147 M, 147 N, 147 K, 147 J, 143 R, 178 E, 178 R, 178 F, 568, 569, 570, 542, 543, 544, 549

[56] References Cited

U.S. PATENT DOCUMENTS

| | | | |
|---|---|---|---|
| 2,370,220 | 2/1945 | Aller et al. | 33/557 |
| 3,889,380 | 6/1975 | Albertazzi | |
| 3,939,567 | 2/1976 | Albertazzi | 33/542 X |
| 4,084,322 | 4/1978 | Albertazzi | 33/550 |
| 4,389,787 | 6/1983 | Solaroli | 33/504 |
| 4,447,959 | 5/1984 | Watanabe et al. | 33/147 N |

FOREIGN PATENT DOCUMENTS 2112140 7/1983 United Kingdom .

Primary Examiner—William D. Martin, Jr.
Attorney, Agent, or Firm—Stevens, Davis, Miller & Mosher

[57] ABSTRACT

An apparatus for measuring dimensions, in particular diameters and axial dimensions of parts with rotational symmetry, comprises a support, a system of slides movable with respect to the support, motors for displacing the slides, transducers adapted to provide signals indicative of the positions of the slides and measuring means carried by the system of slides. In order to perform, accurately and quickly, measurements on different types of parts, the system of slides comprises a longitudinal slide and two slides movable simultaneously and symmetrically along the same transversal directions. The measuring means comprise two measuring heads each of which is fixed to a relevant transversal slide and adapted to measure both in longitudinal and transversal directions. The measurements of the parts are obtained by combining the signals of the transducers and those provided by the measuring heads.

18 Claims, 7 Drawing Figures

APPARATUS FOR MEASURING DIAMETRAL AND AXIAL DIMENSIONS

BACKGROUND OF THE INVENTION

1. Field of the Invention

By present invention relates to an apparatus for measuring dimensions, in particular diametral and axial dimensions of parts with rotational symmetry arranged on a support, with a support structure, a system of slides with a first slide movable with respect to the support structure along a longitudinal axis and a second slide movable along a transversal direction, transducer means adapted to provide signals responsive to the positions of the sides, measuring means carried by the system of slides, and processing means adapted to receive the signals of the transducer means and the signals of the measuring means for combining them. This apparatus will be referred to herebelow as the apparatus of the type set forth.

2. Description of the Prior Art

Automatic gauging machines, or multidimensional gauges are known, for example from U.S. Pat. No. 3,889,380, that substantially comprise a support, a certain number of heads for comparative measurement fixed to the support in a rigid or to certain extent adjustable way, and datum means for positioning the part to be checked. Every measuring head has movable arms with feelers adapted to contact the part in determined points and transducers adapted to detect the displacements of the arms; the transducers are connected to a processing unit that takes care of detecting and possibly combining the signals for obtaining the deviations of the part dimensions from pre-set nominal dimensions.

This type of apparatus is very fast and accurate, the scarcely flexible in its range of applications, because the heads are arranged according to a substantially rigid disposition, for the comparative checking of a determined type of part.

Another known apparatus, in particlar a coordinate measuring machine, is disclosed by British patent application No. 2112140.

Traditionally, coordinate measuring machines were used for applications in the quality control department, or anyway in departments different from the manufacturing shops.

The machine described in British patent application No. 2112140, that—on the contrary—is also intended for measurements in manufacturing shops, comprises a support structure, a system of three slides movable with respect to the support structure along three perpendicular axes, transducer means including incremental linear transducers adapted to detect the positions of the slides with respect to the support structure, measuring means constituted by a measuring head carried by one of the slides and having a feeler for performing measurements along said three perpendicular axes, control means comprising electric motors and driving devices for controlling the displacements of the slides according to a program, and processing means connected to the linear transducers and the measuring head for determining the dimensions of the part as a combination of the relevant signals of the linear transducers and the measuring head. The parts are transferred from the manufacturing line to a round table of the measuring machine, that can be differently oriented.

This coordinate measuring machine is evidently very flexible, since it may check parts of very different types, but is rather slow because, for example, checking a diameter requires at least two touches of the feeler. Moreover, in order to obtain accurate measurement it is indispensable that during the measurement cycle the part remain perfectly stationary, or anyway in exactly known positions with respect to the machine; to this end, as already mentioned, the part is taken away from the manufacturing line and is loaded onto the round table of the measuring machine.

If the machine were used for checking parts arranged in a manufacturing line, for example onto a pallet conveyor, possible settings or vibrations of the pallet, e.g. during the displacements of the slides necessary for subsequently bringing the feeler into contact with diametrically opposite points of a round part, might cause unacceptable errors.

To sum up, since in a coordinate measuring machine every dimension is measured by combining subsequent sequential measurements, each of which relating to a single point, the part positioning is a harshly critical factor.

SUMMARY OF THE INVENTION

Object of the present invention is to realize an apparatus adapted to measure dimensions, such as diameters and axial distances of parts with rotational symmetry, that guarantee a favourable compromise between the features of the multidimensional gauges and those of the coordinate measuring machines.

According to the present invention, the apparatus of the type set forth comprises a third slide movable along said transversal direction and the measuring means comprise two measuring heads fixed to the second slide and the third slide, respectively, and adapted to measure both in longitudinal and transversal direction, the transducer means being adapted to measure the mutual position of the second slide and third slide, the processing means being adapted to determine the dimensions of the parts by vombining the signals provided by the transducer means and the measuring heads.

The invention provides an apparatus capable of performing dimensional checking in manufacturing shops and of checking, with good speed, accuracy and repeatability, dimensions lying within a broad variation range, without requiring a strickly stable and accurate positioning of the part.

By using this apparatus the following main results are achieved: every diameter measurement can be substantially obtained through a single mutual displacement of the two slides carrying the two measuring heads and every measurement of axial dimensions can be performed through the simultaneous use of the same measuring heads.

The main advantages offered by the present invention reside basically in that the measurements relating to diameters are substantially unaffected by the small positioning errors and the limited settlings of the part support which may occurr when the part is arranged in a manufacturing line, and in that for each measurement of axial dimensions it is possible to compensate errors caused by a possible inclination of the part axis with respect to the longitudinal axis of the apparatus.

BRIEF DESCRIPTION OF THE DRAWINGS

The invention shall be now detailedly described with reference to the annexed drawings, given solely by way of non-limiting example, wherein.

DESCRIPTION OF THE PREFERRED EMBODIMENT

Figure 1:
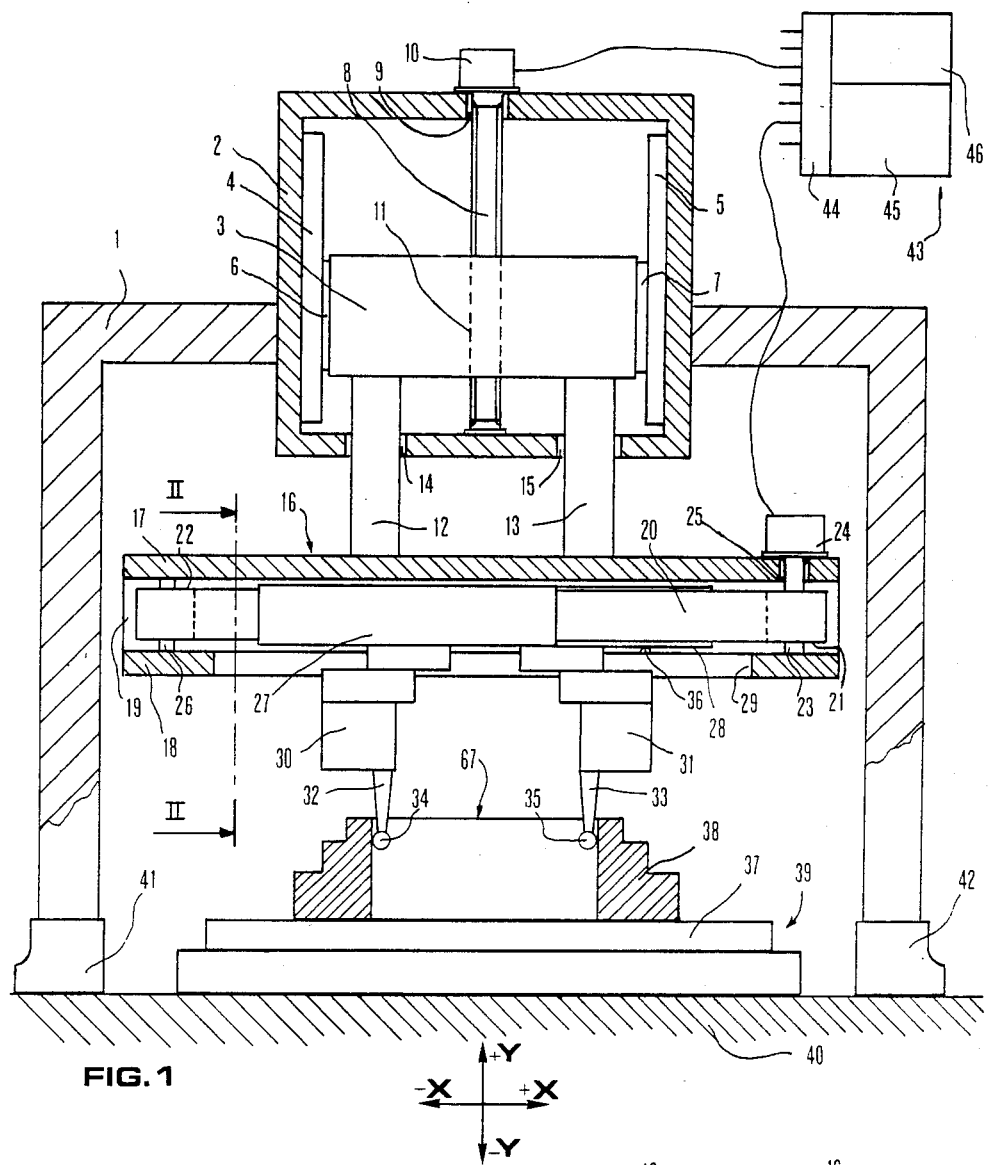
FIG. 1 is a longitudinal section, with some elements in front elevation, of an apparatus according to a preferred embodiment of the invention.

As shown in FIG. 1, fixed to a support structure 1, having a bridge shape, is a housing 2 internally housing a movable element or slide 3. Slide 3 can slide along to the ±Y vertical direction, i.e. the longitudinal geometric axis of the apparatus, along two guide elements 4 and 5, fixed to the walls of housing 2, through suitable sliding devices schematically shown in the figure and indicated by reference numerals 6 and 7.

A threaded spindle 8, parallel to guide elements 4 and 5, has its lower end mounted, through thrust bearings—not shown—onto the lower base of housing 2 and its upper end—coming out from housing 2 via a through hole 9 obtained in the upper base of housing 2—coupled to an electric motor 10 that is fixed to the upper base of housing 2. The section of spindle 8 housed within housing 2 partially engages a threaded bushing 11 fixed to slide 3.

Figure 2:
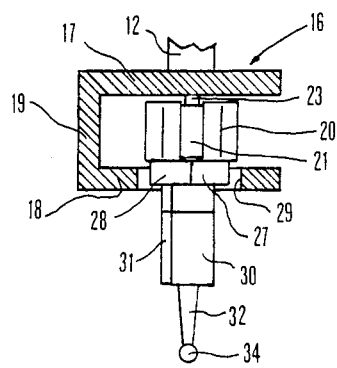
FIG. 2 shows a detail of the apparatus of FIG. 1, sectioned along plane II—II of FIG. 1.

Two vertical columns 12 and 13 fixed to slide 3 pass through the lower base of housing 2 via two through holes 14 and 15. The lower bases of columns 12 and 13, that are arranged externally with respect to housing 2, are fixed to a movable support member 16 substantially constituted by two flat elements or plates 17 and 18, rigidly connected in positions paralleel to each other by a third element or plate 19, perpendicular to the first two elements, that is better visible in FIG. 2.

Arranged between elements 17 and 18 is a belt 20 that closes about two pulleys 21 and 22. Driving pulley 21 is keyed onto a hub 23 that has an end coupled to plate 18—through bearings not shown—in such a way as to be free to rotate about its axis and the other end—passing through plate 17 via a through hole 25—coupled to an external electric motor 24.

Driven pulley 22 is idle onto a pin 26 having its end fixed to plates 17 and 18 in a way (not shown in the figure) adjustable along a direction transversal with respect to the axis of pin 26, for permitting adjustment of the tension of belt 20.

Fixed to belt 20 on opposite sides with respect to the plane defined by the axes of hub 23 and pin 26 are two movable elements, or horizontal slides 27 and 28.

Slides 27 and 28, that consequently are coupled to a common driving device (belt 20), can translate along the ±X transversal direction, i.e. along a horizontal geometric axis, and respectively carry, by means of connecting elements passing through an opening 29 of plate 18, measuring means constituted by two measuring heads 30 and 31, that comprise movable arms 32 and 33, whereto are fixed feelers 34 and 35. Arms 32 and 33 can perform angular and axial displacements permitting feelers 34 and 35 to displace substantially along the +X, −X, +Y and −Y directions.

Heads 30, 31, that substantially are of a known type, also commprise position transducers, not visible in the figures, adapted to provide measurement signals representative of the positions of movable arms 32, 33.

Slides 27 and 28 rest upon guide devices constituted by a plurality of rollers fixed to plate 18 so that they can rotate about their axes; one of said rollers, indicated by reference numeral 36, is shown, as an example, in FIG. 1.

Arranged on a support or rest 37 is the part 38, having rotational symmetry, of which it is desired to check internal and external diameters, and axial sizes, or depths. Part 38, depending also on its weight, can be simply laid on suitable datums of support 37, or locked by suitable clamping devices.

In particular, support 37 can be constituted by a pallet of a pallet conveyor 39—shown very schematically—, moving step-wise. Pallet conveyor 39 is arranged on a basement 40 on which rest, through suitable pedestals 41, 42, the stanchions of support structure 1. As visible in FIG. 1, the stanchions of bridge structure 1 are symmetrically arranged on the two sides of conveyor 39 and support 37, this being advantageous for limiting the influence of yieldings of basement 40 on the mutual position of conveyor 39 and bridge structure 1.

Due to the particular shape of horizontal slides 27 and 28 (FIG. 2) and their position on belt 20, the centers of feelers 34 and 35 lay—and displace, during motion of the three slides 3, 27, 28—on a meridian plane of part 38, being always arranged in positions mutually symmetrical with respect to the geometrical axis of the part itself.

Moreover, the apparatus comprises a cabinet 43 in which are contained input/output circuits 44, a computer numerical control (CNC) 45 and a programmable controller 46.

Figure 3:
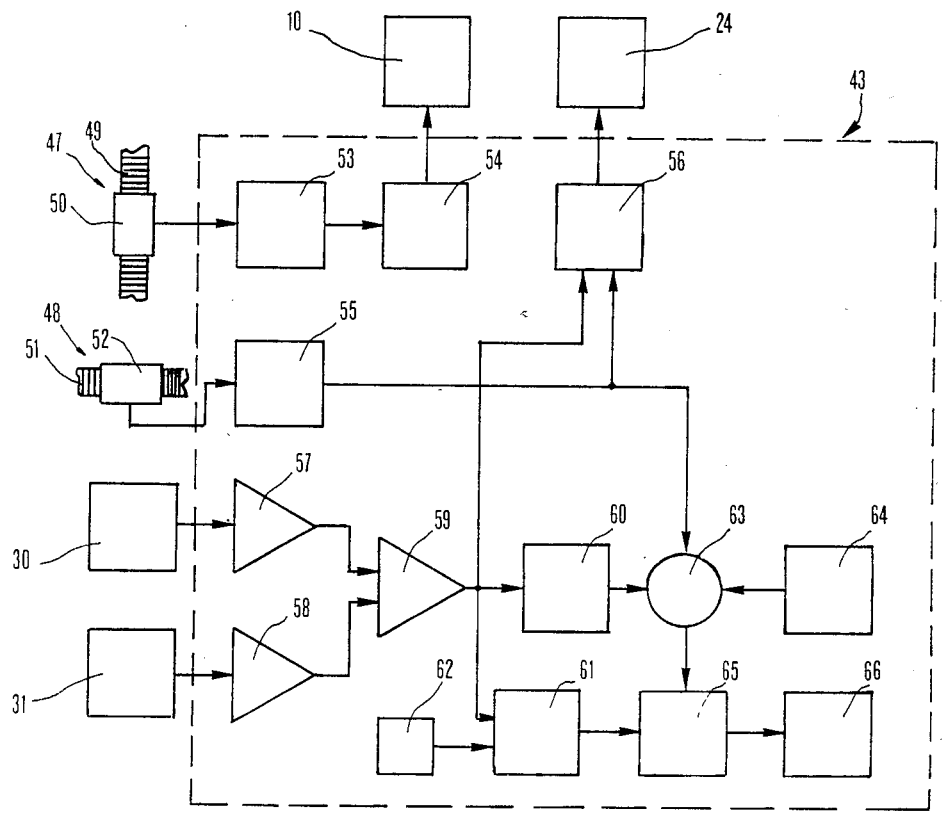
FIG. 3 is a functional block diagram of some circuits of the apparatus of FIGS. 1 and 2, particularly with reference to a cycle for the measuring of one internal diameter.

Input/output circuits 44 are connected, among other things, to motors 10 and 24, to measuring heads 30, 31 and to transducer means constituted by two incremental linear transducers 47, 48 (FIG. 3).

Linear transducer 47, of the optical scale type, is preferably arranged so as to define a geometric axis coinciding with the central axis of the apparatus and comprises a graduated scale 49 fastened to housing 2 and a slider 50 fixed to slide 3. Linear transducer 48 comprises a graduated scale 51 fastened to slide 27 and a slider 52 fixed to slide 28.

The transducer and measuring means, the motor and control means and processing means of the apparatus are schematized in the functional simplified diagram of FIG. 3. In particular, the diagram of FIG. 3 illustrates the functions of some of the circuits contained in cabinet 43 with reference to the checking of an internal diameter.

Linear transducer 47 is connected to a counter 53 that is connected to a group 54 for driving motor 10. Linear transducer 48 is connected, through a counter 55, to a group 56 for driving motor 24. Groups 54 and 56 are controlled depending on the program loaded into numerical control 45.

The output signals of measuring heads 30 and 31 reach, through two amplifiers 57, 58, an analogue summing circuit 59. The output of analogue summing circuit 59 is connected to group 56, to the input of an analog to digital converter 60 and to a comparator or enabling circuit 61 having another input connected to a circuit 62 providing a reference voltage.

A digital adding circuit 63 has three inputs—respectively connected to the outputs of counter 55, of converter 60 and of an adjustment circuit 64—and an output connected to a latch circuit 65.

Circuit 65 has an output connected to a display unit 66.

The operation of the apparatus will now be described with reference to the measurement of the internal diameter of part 38, under the control of the relevant program loaded into numerical control 45.

In rest position, the first slide 3 is at the upper limit of its stroke (i.e. it can only displace along the −Y direction), while horizontal slides 27 and 28 are in the position of maximum approach (i.e. feelers 34 and 35 are at the minimum mutual distance).

The apparatus is started by the relevant keyboard of cabinet 43 and a zero-setting operation on a master part is performed. Then, by acting again on the keyboard, the measurement operation is initiated, by causing starting of motor 10 that, through threaded spindle 8, controls translation of slide 3 along the −Y direction, until feelers 34 and 35 are arranged in correspondence with the cross-section of part 38 the diameter of which must be checked.

The accurate positioning of slide 3 is obtained by means of linear transducer 47.

Then, depending on the program loaded into numerical control 45, motor 24 is actuated and, by causing rotation of driving pulley 21 and consequently motion of belt 20, moves slides 27 and 28 away from each other by displacing them along the −X and +X directions, respectively. The mutual position of slides 27 and 28—that are always arranged symmetrically with respect to the longitudinal geometric axis of the apparatus and to the geometric axis of part 38—is detected by linear transducer 48. Driving group 56, depending on the value of the output signal of summing circuit 59, controls a deceleration and then the stop of motor 24, as will be more clearly described with reference to FIG. 4.

A correction value—that is a function of different parameters, such as the sizes (diameter) of feelers 34, 35, their distance in rest conditions and the values of the signals of transducer 48 and of measuring heads 30, 31 in rest conditions, too—is memorized in adjustment circuit 64 during the initial operation for zero-setting the apparatus on a master part.

Therefore, it is evident that, when feelers 34, 35 are into contact with part 38 and measuring heads 30, 31 are in their linear operation range, the output signal of digital adding circuit 63 is representative of the internal diameter of part 38.

This measurement signal is detected and stored by latch circuit 65, that is enabled by comparator 61, as will be explained with reference to FIG. 4.

Finally, the output signal of circuit 65 is displayed by unit 66 and possibly recorded through a printer arranged in cabinet 43.

Figure 4:
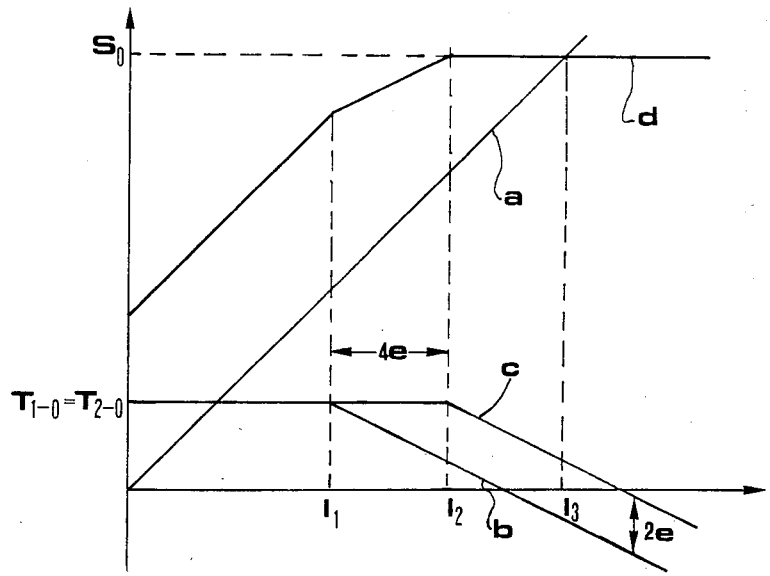
FIG. 4 is a diagram showing the shape of some measurement signals of the apparatus of FIGS. 1 to 3, still as far as the measurement of an internal diameter is concerned.

The diameter of FIG. 4 shows, in analogue form, the variations of the output signals of amplifiers 57, 58, of counter 55 (the digital signal of counter 55 is shown in analogue form for convenience of illustration) and the sum of these three analogue signals, under the following hypotheses.

It is assumed that the zero-setting operation on a master part has been performed, that vertical slide 3 has carried feelers 34, 35 in correspondence with the cross-section of part 38 the diameter of which must be determined, that feelers 34, 35 are initially in condition of maximum mutual approach, and that there is an error of transversal positioning of part 38. As to this positioning error, it is assumed that the geometric axis contained in the plane of FIG. 1 and arranged at equal distances from feelers 34, 35 (i.e. the longitudinal axis, Y, of the apparatus) is at a distance "e" from the geometric axis of part 38.

It is also assumed that, in tnhe operating conditions illustrated in FIG. 4, the output signals of measuring heads 30 and 31 are linear and that, in the position of maximum mutual approach of feelers 34, 35, amplifiers 57, 58 provide signals having values $T_{1-0}=T_{2-0}$ different from zero.

Line "a" represents the value of the output signal of counter 55, broken lines "b" and "c", partially superimposed, represent, respectively, the values of the output signals of amplifiers 57 and 58 and broken line "d" represent the sum of the corresponding values of signals "a", "b", "c".

The abscissae of the diagram of FIG. 4 indicate the mutual distance of horizontal slides 27, 28, starting from the initial condition, in which a zero value for this distance is assumed.

It will be seen from FIG. 4, that the sum signal "d" has the same slope of signal "a" until one of feelers 34, 35, in this case feeler 34 of head 30, comes into contact with part 38, when slides 27 and 28 are at a distance $l_1$. Then the slope of signal "d" decreases because the signal provided by head 30 begins changing with constant slope.

In correspondence with distance $l_2$ between slides 27, 28, feeler 35, too, comes into contact with part 38. Between distances $l_1$ and $l_2$ there is, of course, the relationship: $l_2-l_1=4e$. Subsequently the value of signal "d" remains constant at a value $S_0$. Value $S_0$, compensated with the value (converted into analogue form) provided by adjustment circuit 64, corresponds evidently to the internal diameter of part 38.

The output signal of analogue summing circuit 59 is utilized by group 56 for controlling a deceleration, and subsequently the stop, of motor 24. The deceleration is controlled (with a certain delay) when the first of feelers 34, 35—in the case of FIG. 4, feeler 34—comes into contact with part 38, and the stop (it, too, with a certain delay) when both feelers 34, 35 are into contact with part 38. In this way it is possible to prevent damages of measuring heads 30, 31 and take the diameter measurement when the speed of slides 27, 28 is reduced.

The apparatus can perform diameter measurement in dynamic conditions, too, i.e. when slides 27, 28 are in motion. In particular, it is advantageous to detect the measurement when the values of signals "b" and "c" are equal in absolute value but opposite in sign. To this purpose, comparator 61 is built so as to provide a triggering signal when the values of signals "b", "c" at the outputs of amplifiers 57 and 58 have values $T_1$, $T_2$ the sum of which, $T_1+T_2$, is equal to zero. This corresponds to the distance $l_3$ indicated in the abscissae in the diagram of FIG. 4.

The measurement of external diameters of part 38 takes place, as may be easily understood, in a quite similar way. Since the measurement of every diameter is performed by utilizing the signals of two measuring heads 30, 31 when the relevant feelers 34, 35 are both into contact with part 38, an increase of the measurement speed and a greater accuracy are obtained, with respect to the coordinate measuring machines. Possible transversal settlings of part 38 do not affect the accuracy, while settlings along the longitudinal direction of conveyor 39 (i.e. along the direction perpendicular to the plane of FIG. 1) involve normally negligible chordal errors.

Figure 5:
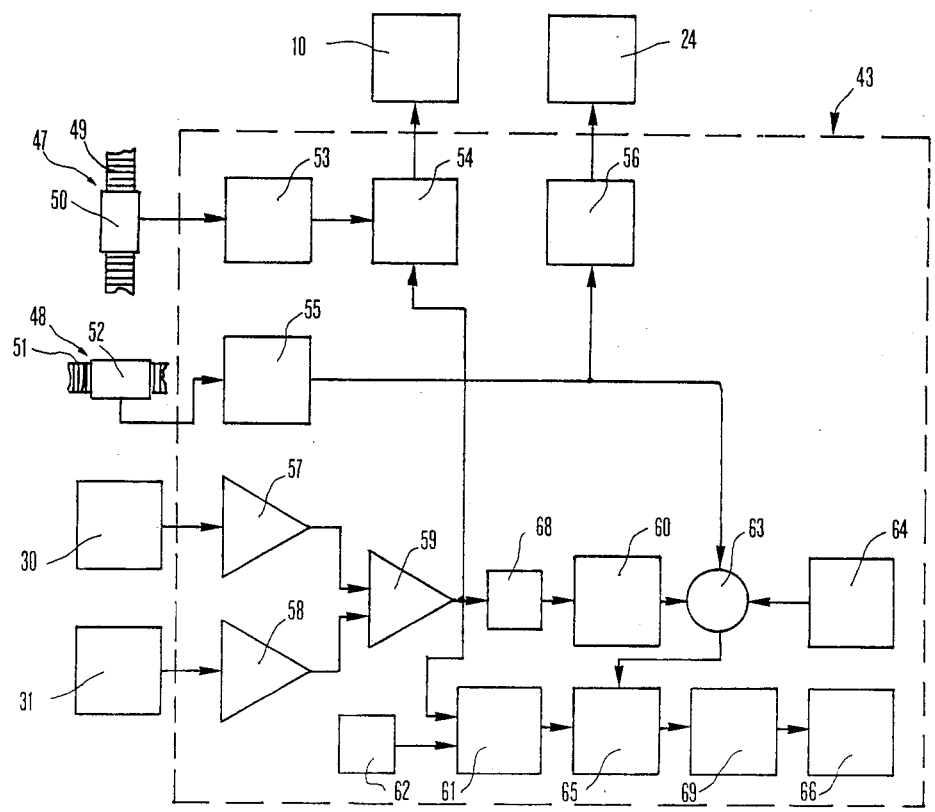
FIG. 5 is a functional block diagram of some circuits of the apparatus of FIGS. 1 and 2, particularly with reference to a cycle for measurement of a longitudinal dimension.
Figure 6:
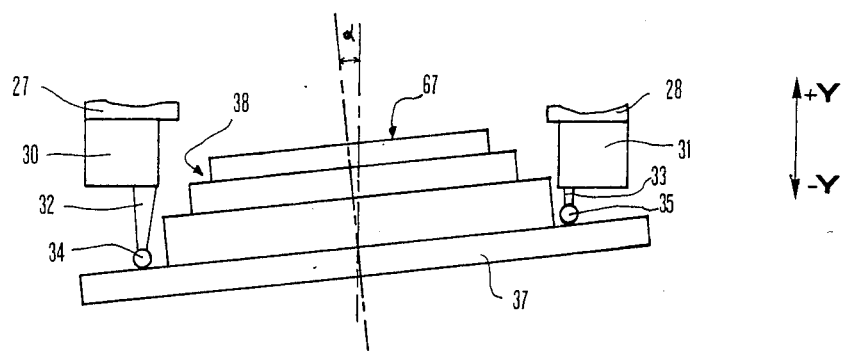
FIG. 6 shows a detail of the apparatus of FIGS. 1, 2 and 5 during the cycle for measurement of the longitudinal dimension.

With reference in particular to FIGS. 5 and 6, the operation of the apparatus will be now described when checking axial dimensions, in the specific case for the measurement of the height of part 38 of FIG. 1, i.e. of the distance between the lower base, that rests on suitable datums of support 37, and the upper base 67.

The diagram of FIG. 5 is similar to that of FIG. 3 and comprises the same circuit blocks, indicated by the same reference numerals of FIG. 3, since they refer to similar functions. The main differences are as follows.

Driving group 56 receives, as control signal, only the signal from counter 55 (and therefore drives motor 24 only depending on the program loaded into numerical control 45 and on the signal of transducer 48); driving group 54 has another control terminal connected to the output of analogue summing circuit 59; arranged between circuit 59 and converter 60 is a dividing circuit 68 adapted to divide by two the value of the input signal and a processing circuit 69 is arranged between latch circuit 65 and display unit 66.

It is also evident that the correction value provided by adjustment circuit 64 and the reference voltage provided by circuit 62 may have different values from those present during the cycle for internal diameter checking.

Initially the apparatus is zero-set on a master part, for adapting it to the measurement of axial dimensions. Of course, it is not necessary to repeat the zero-setting operations (with respsct to the measurements of internal diameters, too) before every measurement cycle: they may be performed, for example, at the commencement of every work shift. Moreover, the zero-setting operations may be carried out—rather than on different master parts—on a single master of suitable shape, for example spherical, that can be permanently arranged in the apparatus.

Then the program loaded in numerical control 45 controls starting of the measurement cycle.

In the present case, it is assumed that part 38 is affected by an angular positioning error (due, for example, to a lack of accuracy in the orientation of support 37), owing to which the geometric axis of part 38 and the longitudinal axis of the apparatus form an angle $\alpha$ different from zero, as shown in FIG. 6, where the error $\alpha$ is manifestly exaggerated, for clarity of illustration, with respect to what can happen in practice.

With vertical slide 3 at the upper limit of its stroke, motor 24 actuates horizontal slides 27, 28 so as to arrange feelers 34, 35 at a suitable distance, depending on the dimensions of support 37 and on the nominal dimensions of part 38. It must be noted, on this regard, that in the practical applications the apparatus can measure different types of parts, depending on relevant programs loaded in numerical control 45. However, as it is normal in these applications, the type of part that arrives into the measurement position is identified by devices of known type (e.g. video-cameras, proximity sensors, etc.) and consequently the corresponding program of numerical control 45 is automatically selected. It is also possible that the controller of the loading device transmit a code identifying the part.

Thereafter, motor 10 displaces slide 3 along the $-Y$ direction until one of the feelers 34, 35 (feelers 35, in the case of FIG. 6) touches a suitable datum on support 37. Group 54, by detecting (for example, through a differentiating circuit and a comparator circuit) the variation of the output signal of summing circuit 59, can thereafter control a deceleration of motor 10. After contact of feeler 34, too, against another datum of support 37 (of course, the two datums are arranged so as to be coplanar with the lower base of part 38, or to be at a determined distance from this base), the output signal of adding circuit 63 remains constant. Circuit 65, enabled by comparator circuit 61 in a manner similar to that described with reference to FIG. 3, detects and stores this signal, that is also received by processing circuit 69, which in its turn memorizes it. Since at the output of circuit 68 there is half of the sum of the output signals of amplifiers 57, 58, the reference level thus determined is referred to the longitudinal axis of the apparatus, i.e. to the geometrical axis of part 38 (since the positioning error $\alpha$ is negligible on this regard).

Motor 10 stops and then inverts its direction of rotation, displacing slide 3 along the $+Y$ direction for a determined amount. Thereafter motor 24 is actuated and causes suitable approach of heads 30 and 31. Then motor 10 makes again slide 3 displace along the $-Y$ direction until feelers 34 and 35 (feeler 35 first and then feeler 34, in the case of FIG. 6) come into contact with the upper base part 38. The measurement of this height takes place in a way similar to what described above. The relevant signal is memorized by processing circuit 69 and compared with the previously memorized reference signal so as to obtain the height of part 38, that is displayed by unit 66.

This measurement cycle has the advantage that, due to the use of two measuring heads 30 and 31, it is possible to refer the measured axial distance to the axis of the apparatus. Of course, in order to obtain the same result with a coordinate measuring machine, a considerably longer measurement cycle would be necessary, and this would increase the possibility of errors caused by settlings of the part during the measurement cycle.

Of course, cycles of measurement of several internal and external diameters and of axial dimensions of a part may be sequentially controlled, through a relevant program, by numerical control 45. Depending on the theoretical shape of the part, it is possible to program the measurement operation by reducing the idle times, in particular preventing return of slides 3, 27 and 28 to the rest position, between subsequent cycles. Thus, by taking advantage of the possibility of detecting the measurements in dynamic way and making the feelers 34, 35 follow the part contour, with suitable sequence, it is possible to obtain a considerably limited total measurement time.

Figure 7:
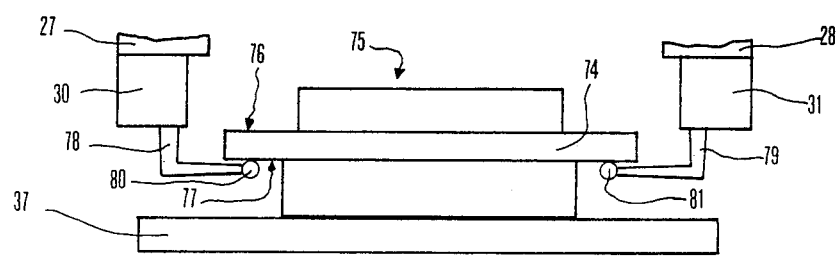
FIG. 7 illustrates a detail of the apparatus of FIG. 1 with measuring heads having special movable arms for checking longitudinal dimensions.

Of course, if this is required by accessibility problems, it is possible to use measuring heads 30, 31 having movable arms with special shapes. For example, in the case of FIG. 7, it is required to check the thickness of a flange 74 of a part 75 arranged on rest 37. For rendering possible to touch both the upper surface 76 and the lower surface 77 of flange 74, heads 30, 31 comprise L-shaped movable arms 78, 79, that bear relevant feelers 80, 81.

The apparatus is particularly adapted to check parts with rotational symmetry, like hubs and shafts. In fact, the symmetrical arrangement of horizontal slides 27, 28 and of the relevant measuring heads 30, 31 allows to perform measurements quickly and with considerable accuracy, by maintaining feelers 34, 35 or 80, 81 in a meridian plane of these types of parts.

If rotational symmetrical parts to be checked are not arranged with their geometrical axis in vertical position, for example because the parts have a length considerably longer than the sectional sizes, the apparatus may be modified accordingly, e.g. by using a first horizontal slide that carries two further slides symmetrically movable along another horizontal axis, perpendicular to the axis of the first slide. The measuring heads, in this case too, are in their turn arranged on the second and third slides so as to be able to check radial and longitudinal sizes of the part.

However, the preferred arrangement of the slides is that shown in FIG. 1, because better accuracy and repeatability of the measurements can be obtained. Therefore, whenever possible it is preferable to properly orient and support the parts so as to measure them by using the embodiment of FIG. 1.

It is evident that each movable arm of the measuring heads may have a plurality of feelers for overcoming problems of accessibility of the different sections of the parts, for shortening measurement cycles, etc.

It is also evident that the apparatus can be provided with further housings, covers and sealing means for protection against chips, oil and other foreign matter.

What is claimed is:

1. An apparatus for measuring dimensions of parts, comprising:
    a support structure;
    a support coupled to the support structure for supporting the part to be measured;
    slide means including: a first slide movable with respect to the support structure along a longitudinal axis and a second slide and a third slide movable along opposite transversal directions;
    transducer means coupled to the slides and the support structure for providing a first transducr signal representative of the position of the first slide with respect to the support structure and a second transducer signal representative of the mutual position of the second and third slides;
    measuring means including two measuring heads carried respectively by the second and third slides for cooperating with the part and providing relevant measurement signals; and
    processing means connected to the transducer means and the measuring heads for providing output signals representative of the dimensions of the part.

2. The apparatus according to claim 1, wherein the part defines an axis of symmetry and the measuring heads are always arranged at equal distances from said axis of symmetry.

3. The apparatus according to claim 2, wherein said measuring heads are capable of performing measurements along directions parallel to said longitudinal axis and along said transversal directions.

4. The apparatus according to claim 3, further comprising control means including: a first motor for displacing the first slide and a second motor coupled to the second and third slides for simultaneously displacing the second and third slides.

5. The apparatus according to claim 2, wherein the part has circular cross-section perpendicular to said axis of symmetry and the measuring heads comprise relevant movable arms with feelers for contacting diametrically opposite points of the part, the processing means providing an output signal representative of the diameter of the part by processing the second transducer signal and the measurement signals of the measuring heads.

6. The apparatus according to claim 2, wherein the measuring heads comprise relevant arms carrying feelers for contacting the part, the arms being movable, with respect to the relevant slide, substantially along said transversal directions, the processing means being connected to the second transducer for calculated dimensions of the part along said transversal directions by processing the second transducer signal and the measurement signals of the measuring heads.

7. The apparatus according to claim 1, for performing measurements on a part defining surfaces substantially pependicular to said longitudinal axis, wherein the measuring heads comprise relevant arms carrying feelers for contacting the part, the arms being movable, with respect to the slide carrying the relevant measuring head, along directions substantially parallel to said longitudinal axis, and wherein the processing means are connected to the first transducer for calculating heights or distances with regard to said surfaces of the part by combining the first transducer signal with a signal obtained by processing the measurement signals of the measuring heads, for referring the measurements to said longitudinal axis.

8. Apparatus for measuring dimensions, in particular diametral and axial dimensions of parts with rotational symmetry comprising: a support for the part to be measured, a support structure, a system of slides with a first slide movable with respect to the support structure along a longitudinal axis and a second slide and a third slide movable along a transversal direction, transducer means adapted to provide signals responsive to the positions of the slides, measuring means carried by the system of slides, and processing means adapted to receive the signals of the transducer means and the signals of the measuring means for combining them, wherein the measuring means comprise two measuring heads fixed to the second slide and the third slide, respectively, and adapted to measure both in longitudinal and transversal directions, the transducer means being adapted to measure the mutual position of the second slide and third slide, the processing means being adapted to determine the dimensions of the parts by combining the signals provided by the transducer means and the measuring heads.

9. The apparatus according to claim 8, wherein the second slide and the third slide are coupled to each other for taking, when checking a part with rotational symmetry, positions substantially symmetrical with respect to the geometric axis of the part.

10. The apparatus according to claim 9, wherein the measuring heads comprise relevant feelers and wherein, when checking a part with rotational symmetry, the feelers are arranged, in measurement conditions, substantially on a plane passing through the geometric axis of the part.

11. The apparatus according to claim 10, wherein said transducer means comprise a first transducer adapted to provide a signal responsive to the position of the first slide with respect to the support structure and a second transducer adapted to provide a signal responsive to the mutual position of the second and third slides.

12. The apparatus according to claim 11, wherein said processing means are adapted to determine axial dimensions of parts with rotational symmetry by combining the signals provided by the two measuring heads for referring to determined axial dimensions to the geometric axis of the part.

13. The apparatus according to claim 12, further comprising motor means for driving said slides and control means for controlling in an automatic way the apparatus operation, the control means being connected to the transducers and the measuring heads for controlling the speed of the motor means depending on the signals of the transducers and of the measuring heads.

14. The apparatus according to claim 13, wherein the processing means comprises an enabling circuit for controlling the detection of the measurements of the dimensions of the part when the signals of the measuring heads are in a pre-set mutual relationship.

15. The apparatus according to claim 14, wherein said support structure is substantially of the bridge type and comprises stanchions symmetrically arranged with respect to two sides of the support for the part.

16. The apparatus according to claim 15, wherein the part to be checked, with rotational symmetry, is arranged on the support with its geometric axis in vertical direction, parallel to said longitudinal axis.

17. An apparatus for measuring diameters and axial dimensions of shaft-like parts defining a geometrical axis, comprising:
 a support structure;
 a support coupled to the support structure, for supporting the part to be measured;
 slide means movable with respect to the support structure and including: a first slide movable along a longitudinal axis substantially parallel to said geometric axis; and a second and a third slide movable along opposite directions substantially perpendicular to said geometric axis;
 driving means for displacing said slides, including: first driving means for displacing the first slide; and second driving means for simultaneously displacing said second and third slides maintaining them substantially in symmetrical positions with respect to said geometric axis;
 transducers means including a first transducer for providing a first transducer signal representative of the position of the first slide with respect to the support structure and a second transducer for providing a second transducer signal representative of the mutual distance between the second and third slides;
 a first measuring head and a second measuring head, respectively carried by the first slide and second slide, each measuring head providing a measuring signal and including: one movable arm; and feeler means fixed to the movable arm for contacting the part, the movable arm being movable to detect measurements along directions parallel to said longitudinal axis and directions parallel to said opposite directions;
 computer numerical control means connected to the driving means, the transducer means and the first and second measuring heads, for controlling the driving means depending on the first and second transducer signals and on the measuring signals of the measuring heads, and for obtaining measurement signals by processing said transducer signals and measuring signals.

18. The apparatus according to claim 17, wherein the computer numerical control means are adapted to control detection of the values of said transducer signals and measuring signals, for obtaining said measurement signals, when the measuring signals of the first and second measuring heads have a determined mutual relationship.

* * * * *

UNITED STATES PATENT AND TRADEMARK OFFICE
CERTIFICATE OF CORRECTION

PATENT NO. : 4,562,648

DATED : January 7, 1986

INVENTOR(S) : Franco DANIELLI

It is certified that error appears in the above-identified patent and that said Letters Patent is hereby corrected as shown below:

Column 1, line 7, "By" should be --The--;
Column 1, line 40, "particlar" should be --particular--.
Column 2, line 3, "measurement" should be --measurements--;
Column 2, line 40, "vombining" should be --combining--.
Column 3, line 51, "paralleel" should be --parallel--.
Column 4, line 13, "commprise" should be --comprise--.
Column 6, line 17, "tnhe" should be --the--;
Column 6, lines 26-27, "represent" should be --represents--.
Column 7, line 42, "respsct" should be --respect--.
Column 9, line 46, "transducr" should be --transducer--.
Column 10, line 4, "cross-section" should be --cross-sections--
Column 10, line 17, "calculated" should be --calculating--;
Column 10, line 23, "pependicular" should be --perpendicular--.
Column 11, line 19, "comprises" should be --comprise--.

Signed and Sealed this

Thirteenth Day of May 1986

[SEAL]

Attest:

DONALD J. QUIGG

Attesting Officer      Commissioner of Patents and Trademarks